(12) United States Patent
Lane

(10) Patent No.: US 11,758,636 B2
(45) Date of Patent: Sep. 12, 2023

(54) CELESTIAL SCHEDULING OF A SMART STREETLIGHT CONTROLLER

(71) Applicant: Ubicquia, Inc., Fort Lauderdale, FL (US)

(72) Inventor: Jonathan Scott Lane, Melbourne, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 0 days.

(21) Appl. No.: 17/217,902

(22) Filed: Mar. 30, 2021

(65) Prior Publication Data

US 2021/0307146 A1 Sep. 30, 2021

Related U.S. Application Data

(60) Provisional application No. 63/002,190, filed on Mar. 30, 2020.

(51) Int. Cl.

| | |
|---|---|
| *H05B 47/165* | (2020.01) |
| *H05B 47/16* | (2020.01) |
| *H05B 47/185* | (2020.01) |
| *G01C 21/02* | (2006.01) |
| *F21S 8/08* | (2006.01) |

(52) U.S. Cl.
CPC ......... *H05B 47/165* (2020.01); *H05B 47/16* (2020.01); *H05B 47/185* (2020.01); *F21S 8/085* (2013.01); *G01C 21/025* (2013.01)

(58) Field of Classification Search
CPC .... H05B 47/165; H05B 47/16; H05B 47/185; H05B 47/11; H05B 47/22; H05B 47/19; F21S 8/085; G01C 21/025; F21V 23/045; F21W 2131/103; Y02B 20/40
See application file for complete search history.

(56) References Cited

U.S. PATENT DOCUMENTS

| | | | | |
|---|---|---|---|---|
| 10,219,360 | B2 * | 2/2019 | Vendetti | F21V 23/06 |
| 2013/0057158 | A1 * | 3/2013 | Josefowicz | G01S 19/14 |
| | | | | 315/312 |
| 2019/0341732 | A1 * | 11/2019 | Aaron | H04B 10/2575 |

OTHER PUBLICATIONS

Geoffrey Blewitt, "GPS, Reference System", Nevada Bureau of Mines and Geology/Seismological Laboratory, University of Nevada, Mail Stop 178, Reno, NV 89557, USA, (C) Springer International Publishing Switzerland 2016, pp. 1-8 (Year: 2016).*

Doggett et al., *Almanac for Computers 1990*, Nautical Almanac Office, United States Naval Observatory, Washington, DC 20392, 1990. (109 pages).

* cited by examiner

*Primary Examiner* — Daniel D Chang
(74) *Attorney, Agent, or Firm* — Daniel C. Crilly; Thomas J. Satagaj

(57) ABSTRACT

A method to control a streetlight with a smart streetlight controller, includes isolating a terrestrial position of the smart streetlight controller, isolating a specific date, and calculating, at the smart streetlight controller, a time value associated with an event, such as sunrise or sunset, that is defined by a position of the sun on the specific date. The method further includes generating a streetlight control time by applying an offset to the time value, and executing a streetlight control command, such as a command to turn the streetlight on or off, at the streetlight control time.

12 Claims, 5 Drawing Sheets

CELESTIAL SCHEDULING OF A SMART STREETLIGHT CONTROLLER

CROSS-REFERENCE TO RELATED APPLICATIONS

This application claims the priority benefit of U.S. Provisional Patent Application No. 63/002,190, filed Mar. 30, 2020. This application is hereby incorporated by reference in its entirety.

BACKGROUND

Technical Field

The present disclosure generally relates to a programmatic scheduling of turn-on and turn-off times for streetlight controllers. More particularly, but not exclusively, the present disclosure relates to controlling a streetlight based on a calculated position of the sun relative to a specific terrestrial location.

Description of the Related Art

Known streetlight controllers have onboard photo-sensitive circuitry that is arranged to generate one or more outputs based on sensed light in the area proximate the photo-sensitive circuitry. Simply, when the photo-sensitive circuitry of the streetlight controller detects that ambient light has fallen below a threshold, the streetlight turns on, and when the circuitry detects that ambient light has risen above a threshold, the streetlight turns off.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable a smart streetlight controller to identify its own terrestrial location, calculate the position and orientation of the sun relative to that terrestrial location on Earth, determine sunrise and sunset times at the smart streetlight controller location, and control the light source accordingly. The inventor has further contemplated various adjustments to the control based on capabilities of the smart streetlight controller. For example, any suitable offset from the time a light source turns on or turns off may be applied. Exemplary and non-limiting offsets may include manual adjustments, programmatic adjustments, adjustments for local weather conditions, adjustments for other celestial events (e.g., full moon, eclipse, and the like), adjustments for season, and adjustments for daylight savings time. Other adjustments based on locally sensed circumstances and data available in one or more databases, repositories, websites, or other network-accessible sources are also contemplated.

In a first embodiment, a smart streetlight controller includes: a standardized powerline interface arranged to electromechanically couple the smart streetlight controller to a streetlight, the standardized powerline interface having primary contacts arranged to pass a plurality of power transmission signals and secondary contacts arranged to communicate illumination signal information to the streetlight when the smart streetlight controller is installed at the streetlight; a location positioning device; a control interface arranged to communicate illumination signal information to a streetlight; a processor arranged to receive terrestrial position information from the location position device; and a memory coupled to the processor. The memory has instructions stored therein which, when executed by the processor, cause the processor to: isolate, via the terrestrial position information, a terrestrial position of the smart streetlight controller; isolate a specific date; calculate a time value associated with an event defined by a position of the sun on the specific date at the terrestrial position; generate a streetlight control time by applying an offset to the time value; and cause the illumination signal information to be presented to the at least one set of secondary contacts at the streetlight control time. One example of a location positioning system is a global positioning system (GPS) device.

In some cases of the first embodiment, the standardized powerline interface is compliant with a roadway area lighting standard promoted by a standards body. In some cases, the terrestrial position includes a latitude value and a longitude value. Sometimes, the illumination signal information directs the streetlight to turn on or the illumination signal information directs the streetlight to turn off. And sometimes, the illumination signal information directs the streetlight to dim to a specific light output or the illumination signal information directs the streetlight to flash. In these or other cases of the first embodiment, the specific date is derived from the terrestrial position information.

In a second embodiment, a non-transitory computer-readable storage medium has stored contents that configure a smart streetlight controller to perform a method. The method includes: isolating a terrestrial position of the smart streetlight controller based on information received from a location positioning module; isolating a specific date; based on a position of the sun on the specific date at the terrestrial position, generating a streetlight control time; and causing illumination signal information to be presented to a set of secondary contacts at the streetlight control time. The set of secondary contacts is integrated in a standardized powerline interface of the smart streetlight controller, the standardized powerline interface is arranged to electromechanically couple the smart streetlight controller to a streetlight via primary contacts, and the secondary contacts are arranged to communicate illumination signal information to the streetlight when the smart streetlight controller is installed at the streetlight. One example of a location positioning system is a global positioning system (GPS) device.

In some cases of the second embodiment, the information received from the location positioning module providing the terrestrial position represents a latitude value and a longitude value of the smart streetlight controller, and in some cases, the specific date is in a current date at a location where the smart streetlight controller is installed. Sometimes, the method further includes applying a user-controlled offset to the illumination signal information.

In a third embodiment, a method to control a streetlight with a smart streetlight controller, includes: isolating a terrestrial position of the smart streetlight controller; isolating a specific date; calculating, at the smart streetlight controller, a time value associated with an event defined by a position of the sun relative to the terrestrial position of the smart streetlight controller on the specific date; generating a streetlight control time by applying an offset to the time value; and executing a streetlight control command at the streetlight control time.

In some cases of the third embodiment, the event is a local time of sunrise at the terrestrial position, and in some cases, the event is a local time of civil dawn at the terrestrial position. In these and other cases, the event is a local time of sunset at the terrestrial position or a local time of civil dusk at the terrestrial position. Sometimes, the offset for sunset is different from the offset for sunrise. In at least some cases of the third embodiment, the offset is zero or a user-controlled value. In some cases, the terrestrial position includes a latitude value and a longitude value, and in some cases, the specific date is in a Gregorian calendar format.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
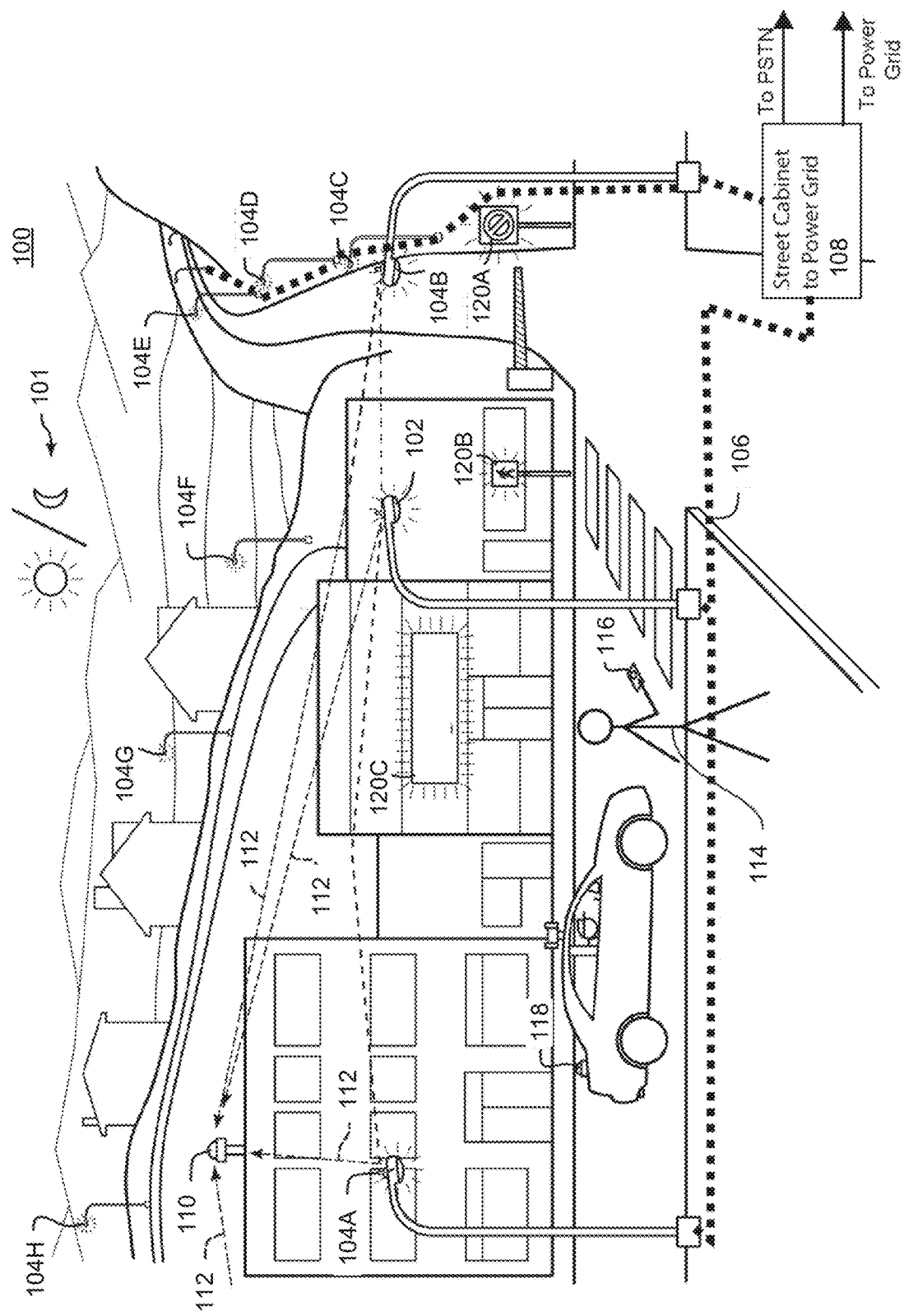
FIG. 1 is a system level deployment having a plurality IIOT device embodiments.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Smart streetlight controllers of the type described herein may also be referred to as Internet of Things (IOT) devices or Industrial Internet of Things (IIOT) devices. IOT and IIOT devices are fixed and/or mobile electronic computing devices that are coupled or coupleable to a computing network. IOT devices are often described as devices with consumer facing applicability and IIOT devices are often described as devices with industrial, or machine-to-machine, applicability. The two types of devices (i.e., IOT and IIOT devices), and other like devices, have one or more computing processors, memory storing instructions that direct operations of the one or more computing processors, and network circuitry. In many cases, the IOT and IIOT devices also include a power source (e.g., one or more of a battery, a physical power interface, a power supply, a photovoltaic cell, an induction coil, etc.), at least one sensor (e.g., accelerometer, thermometer, pressure sensor, etc.), and memory to store data collected by the device, control parameters, or both.

To avoid confusing or obfuscating the inventive subject matter disclosed herein, the present disclosure will predominantly describe system, method, and device embodiments in the context of one or more smart streetlight controllers or IIOT devices. Nevertheless, one of skill in the art will recognize that the principles described herein are not so limited, and such principles may be equally applicable to IOT devices, specialized computing devices, other smart devices, smart home devices, mobile computing devices, wearable devices, and other like devices. Accordingly, unless expressly described otherwise, or unless the context demands otherwise, each use of the term "IIOT" may be interchangeably replaced with the terms, "IOT," "smart," or any other suitable term.

Rather than a general-purpose computing device, an IIOT device is typically arranged to perform a particular function or set of functions such as controlling a streetlight. In other cases, an IIOT device may, for example, be arranged as an environmental sensor that collects data such as temperature, humidity, air quality, and the like. In these cases, the IIOT device is deployed in a city, rural area, or some other location, and the device is either programmed on site or at the factory to communicate with a specific local or remote computing server. The local or remote computing server may be arranged at a great distance (e.g., tens, hundreds, or even thousands of miles away) from the IIOT device. Alternatively, the local or remote computing server may be a smart phone tablet, or other computing device permanently or transitorily arranged a short distance (e.g., tens or hundreds of feet or inches or some other distance) from the IIOT device. In these cases, the IIOT device is programmed to communicate data to, from, or to and from a specific local or remote computing server.

The smart streetlight controllers illustrated in the present figures and described in the present specification improve the reliability, energy efficiency, and safety of streetlighting. Conventional streetlight controllers include photo-sensitive circuitry (e.g., a photosensor) to determine when the streetlight should turn on and when the streetlight should turn off. If the photosensor circuit fails, or if a window to the sensor is obstructed (e.g., by dirt, fowl, damage, or some other cause), the streetlight may either be wastefully over-illuminated (e.g., always illuminated) or dangerously under-illuminated (e.g., always extinguished). In the present disclosure, a programmatic approach to overcome the limitations of conventional streetlight controllers is proposed. The new approach may be used cooperatively with photo-sensitive circuitry or as an alternative to photo-sensitive circuitry. What's more, with a determined level of expected ambient light, the streetlight controller may finely tune a streetlight to illuminate more brightly or less brightly in a desired way (e.g., more brightly in a new moon cycle, less brightly in a full moon cycle, more brightly in the middle of the night, less brightly at dawn and dusk, and the like). This improvement can increase safety, save energy, and provide a more uniform illumination over the course of a single evening or a climatic season. The device, method, and system embodiments described in this disclosure (i.e., the teachings of this disclosure) enable a smart streetlight controller to identify its own terrestrial location (i.e., a substantially exact location on Earth where the streetlight is positioned), calculate the position and orientation of the sun relative to that terrestrial location on Earth, determine sunrise and sunset times at the terrestrial location of the smart streetlight controller, and control the light source accordingly. It has been further contemplated that various adjustments to the streetlight control can be made based on certain capabilities of the smart streetlight controller. For example, a user may direct a suitable offset be applied to the calculated time that a light source should or otherwise does turn on or turn off. Other exemplary and non-limiting offsets may include manual adjustments, programmatic adjustments, adjustments for local weather conditions, adjustments for other celestial events (e.g., full moon, eclipse, and the like), adjustments for season, and adjustments for daylight savings time. And still other adjustments based on locally sensed circumstances and data available in one or more databases, repositories, websites, or other network-accessible sources are also contemplated.

Smart streetlight controllers are generally coupled to a streetlight luminaire via a standardized powerline interface. The standardized powerline interface defines a limited number of electrical/communicative conduits over which signals may be passed in-to or out-from the streetlight controller. In some cases, as will be discussed herein, the interface may be referred to as a Zhaga interface, a NEMA interface, a NEMA socket, an ANSI C136 interface, or the like. In some embodiments, this interface includes primary contacts arranged to pass a plurality of power transmission signals and secondary contacts arranged to communicate illumination signal information to the streetlight when the smart streetlight controller is installed at the streetlight. The secondary contact may also be referred to as a control interface, a dimming interface, or some other like term.

A known NEMA interface implements the powerline interface with connectors and receptacles that include seven electrical/communicative conduits (e.g., pins, blades, springs, connectors, receptacles, sockets, and other like "contacts"). A set of three primary contacts carry a Line voltage signal, a Load voltage signal, and Neutral voltage signal. A set of four secondary contacts may be used by the streetlight controller to pass power, control information, status information, and the like. The four secondary contacts may be treated as a first pair of secondary contacts and a second pair of secondary contacts.

FIG. 1 is a system level deployment 100 having a plurality of IIOT device embodiments. At least one IIOT device is implemented as a small cell networking device and a plurality of IIOT devices are implemented as smart sensor devices coupled to streetlight fixtures. The smart sensor devices are in many, but not all, cases implemented as smart streetlight controllers. The plurality of smart sensor devices includes the inventive celestial scheduling technology described in the present disclosure. The small cell networking device, traffic lights, public information signs, private entity signs, and the like may also include celestial scheduling technology of the type described here.

The sun and moon 101 are shown in FIG. 1. Light or the absence of light based on time of day, weather, geography, or other causes provide information (e.g., ambient light) to light sensors of light pole mounted devices described in the present disclosure. Additionally, or alternatively, light or the absence of light may be calculated based on the celestial positions of the sun, moon, and stars relative to the terrestrial position (i.e., geographic location) of a streetlight of interest relative. Based on this electronically captured or programmatically derived information, an associated light source may be suitably controlled.

Streetlight fixtures in FIG. 1 are coupled to, or otherwise arranged as part of, a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. In the system level deployment 100, at least one light pole includes a fixture with a small cell networking device 102, and a plurality of light poles each have a smart sensor IIOT device 104A-104H. In the present disclosure, light poles having a smart sensor IIOT device 104A-104H may individually or collectively be referred to as light poles having a smart sensor IIOT device 104 or simply light poles 104 for brevity. In these cases, and for the purposes of the present disclosure, the light sensor of each light pole 104 may be structurally and operatively identical (i.e., having same or substantially similar circuitry and embedded software, and differing by way of one or more network-level system identifiers).

As shown in the system level deployment 100, a plurality of light poles 102, 104 are arranged in one or more determined geographic areas, and each light pole 102, 104 has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground. In other system level deployments according to the present disclosure, there may be 1,000 or more light poles 102, 104 arranged in one or more determined geographic areas. In these or in still other cases, the streetlight fixtures may of course be lower than 20 feet above the ground or higher than 40 feet above the ground. Although described as being above the ground, streetlight fixtures shown and contemplated in the present disclosure may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities shares control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 100 of FIG. 1, any number of streetlight poles 102, 104 and their associated fixtures may be arranged with a connector that is compliant with a roadway area lighting standard promoted by a standards body such as ANSI C136.41 (e.g., a NEMA-based connector/socket system). The connector permits the controlling or servicing authority of the system to competitively and efficiently purchase and install light sensors on each streetlight fixture. In addition, or in the alternative, the standardized connector in each streetlight fixture permits the controlling or servicing authority to replace conventional light sensors with other devices such as a small cell networking device, a smart sensor IIOT device embodied as a smart streetlight controller 120 (FIGS. 2-3), or some other IIOT device.

In the system level deployment 100, a small cell networking device is electromechanically coupled to a selected light pole 102 wherein the electromechanical coupling is performed via the connector that is compliant with the roadway area lighting standard promoted by a standards body. Stated differently, the system level deployment 100 includes at least one light pole and fixture with a small cell networking device 102, and a plurality of light poles each having a smart sensor IIOT device 104A-104H. In these light poles 104, each streetlight fixture is equipped with a standalone IIOT device, such as the smart streetlight controller 120 of FIGS. 2, 3, that is electromechanically coupled via a respective connector compliant with the roadway area lighting standard promoted by the standards body. In this arrangement, each streetlight 102, 104 is equipped with a light sensor circuit that is further electrically coupled to a processor-based light control circuit. In at least some of these embodiments, electrically coupling the light sensor to the processor-based light control circuit includes passing a signal representing an amount of light detected by the light sensor to the processor-based light control circuit. In at least some of these embodiments, the light sensor is arranged to detect an amount of lux, lumens, or other measurement of luminous flux and generate the signal representing the amount of light detected.

The processor-based light control circuit of each IIOT device (e.g., each smart streetlight controller 120) is arranged to provide a light control signal to the respective light source based on at least one ambient light signal generated by a light sensor associated with the processor-based light control circuit. In addition, because each streetlight 102, 104 is equipped with communication capabilities, each light source in each streetlight 102, 104 can be controlled remotely as an independent light source or in combination with other light sources. In at least some of these cases, each of the plurality of light poles and fixtures with a smart sensor IIOT device 104 is communicatively coupled to the light pole and fixture with a small cell networking device 102. The communicative relationship from each of the plurality of light poles and fixtures with a smart sensor IIOT device 104 to the light pole and fixture with a small cell networking device 102 may be a direct communication or an indirect communication. That is, in some cases, one of the plurality of light poles and fixtures with a smart sensor IIOT device 104 may communicate directly to the light pole and fixture with a small cell networking device 102 or the one of the plurality of light poles and fixtures with a smart sensor IIOT device 104 may communicate via one or more other ones of the plurality of light poles and fixtures with a smart sensor IIOT device 104 or via some other means (e.g., via a cellular communication to a traditional cellular macro-cell, via a wired connection, or the like).

In the system level deployment 100 of FIG. 1, various ones of the light poles may be 50 feet apart, 100 feet apart, 250 feet apart, or some other distance. In some cases, the type and performance characteristics of each small cell networking device and each smart sensor IIOT device (e.g., smart streetlight controller 120) are selected based on their respective distance to other such devices such that wireless communications are acceptable.

The light pole and fixture with a small cell networking device 102 and each light pole and fixture with a smart sensor IIOT device 104 may be directly or indirectly coupled to a street cabinet 108 or other like structure that provides utility power (e.g., "the power grid") in a wired way. The utility power may provide 120 VAC, 208 VAC, 220 VAC, 240 VAC, 260 VAC, 277 VAC, 360 VAC, 415 VAC, 480 VAC, 600 VAC, or some other power source voltage. In addition, the light pole and fixture with a small cell networking device 102, and optionally one or more of the light poles and fixtures with smart sensor devices 104A-104H, are also coupled to the same street cabinet 108 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications (PLC), or the like). For simplification of the system level deployment 100 of FIG. 1, the wired backhaul and power line 106 is illustrated as a single line. In the embodiment of FIG. 1, the street cabinet 108 is coupled to the power grid, which is administered by a licensed power utility agency, and the street cabinet 108 is coupled to the public switched telephone network (PSTN). In other embodiments, the street cabinet 108 may be electrically, communicatively, or electrically and communicatively to some other infrastructure (e.g., power source, satellite communication network, or the like) such as a windmill, generator, solar source, fuel cell, satellite dish, long- or short-wave transceiver, or the like.

In some embodiments, any number of small cell networking devices 102 and smart sensor devices 104 are arranged to provide utility grade power metering functions. The utility grade power metering functions may be performed with a circuit arranged apply any one or more of a full load, a partial load, and a load where voltage and current are out of phase (e.g., 60 degrees; 0.5 power factor). Other metering methodologies are also contemplated.

Each light pole and fixture with a smart sensor IIOT device 104 is in direct or indirect wireless communication with the light pole and fixture that has the small cell networking device 102. In addition, each light pole and fixture with a smart sensor IIOT device 104 and the light pole and fixture with the small cell networking device 102 may also be in direct or indirect wireless communication 112 with an optional remote computing device 110. The remote computing device 110, when it is included in the system level deployment 100, may be controlled by a mobile network operator (MNO), a municipality, another government agency, a third party, or some other entity. By this optional arrangement, the remote computing device 110 can be arranged to wirelessly communicate light control signals and any other information (e.g., packetized data) between itself and each respective wireless networking device coupled to any of the plurality of light poles. A user 114 holding a mobile device 116 is represented in the system level deployment 100 of FIG. 1. A vehicle having an in-vehicle mobile device 118 is also represented. The vehicle may be an emergency service vehicle, a passenger vehicle, a commercial vehicle, a public transportation vehicle, a drone, or some other type of vehicle. The user 114 may use their mobile device 116 to establish a wireless communication session over a cellular-based network controlled by an MNO, wherein packetized wireless data is passed through the light pole and fixture with a small cell networking device 102. Concurrently, the in-vehicle mobile device 118 may also establish a wireless communication session over the same or a different cellular-based network controlled by the same or a different MNO, wherein packetized wireless data of the second session is also passed through the light pole and fixture with a small cell networking device 102.

Figure 2:
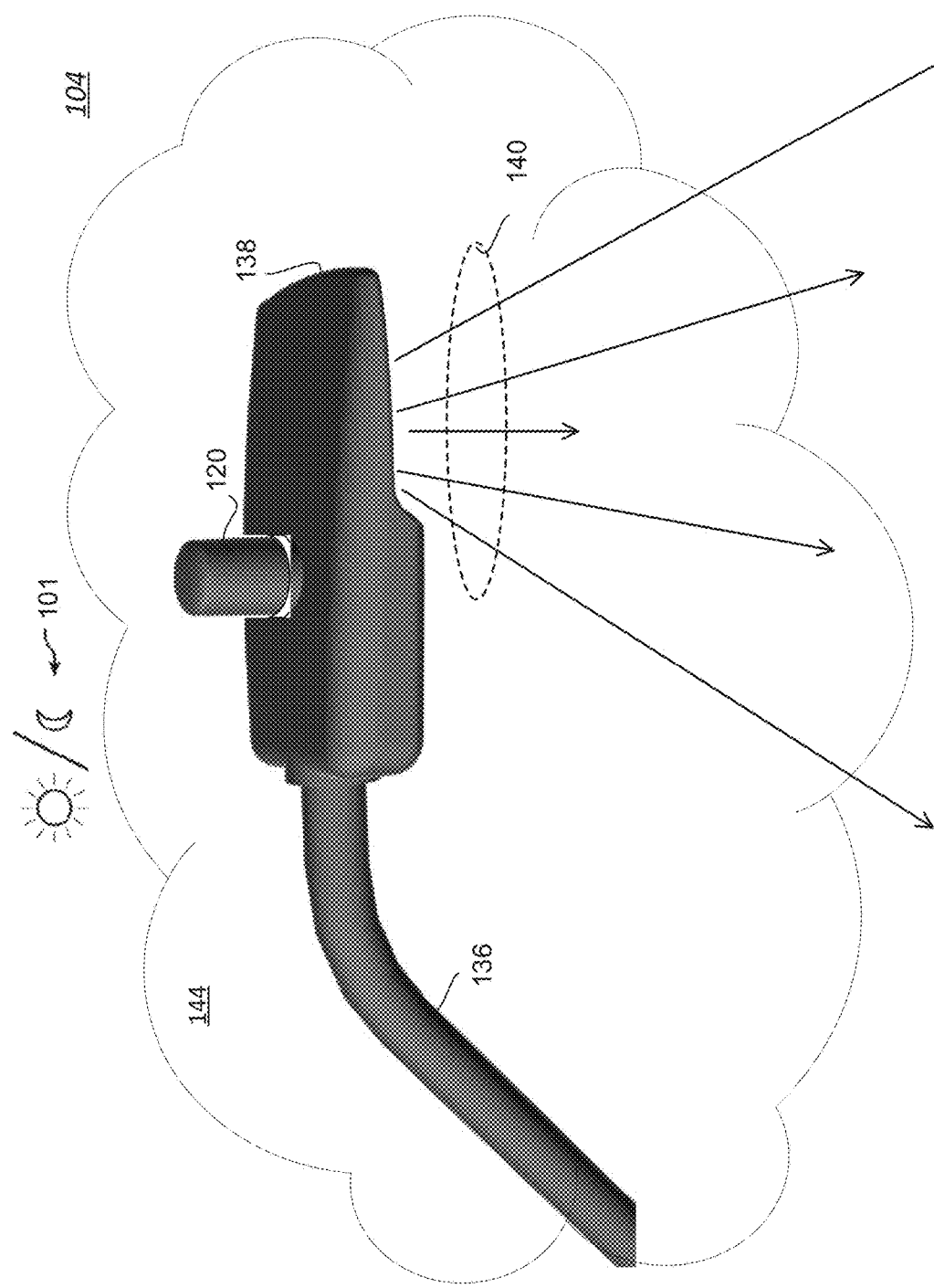
FIG. 2 is portion of a light pole and fixture with a smart sensor IIOT device.

Other devices may also communicate through light pole-based devices of the system level deployment 100. These devices may be IOT devices, IIOT devices, or some other types of smart devices. In FIG. 1, two public information signs 120A, 120B, and a private entity sign 120C are shown, but many other types of devices are contemplated. Each one of these devices may form an unlicensed wireless communication session (e.g., WiFi) or a cellular-based wireless communication session with one or more wireless networks made available by the devices shown in the system level deployment 100 of FIG. 1. FIG. 2 is portion of a streetlight pole and luminaire fixture with a smart sensor IIOT device 104. A streetlight support structure 136 (e.g., a pole) supports the luminaire 138. The luminaire 138 has a top-side connector (e.g., a socket) that is compliant with a roadway area lighting standard promoted by a standards body such as ANSI C136.41 (e.g., a NEMA-based connector/socket system). A smart sensor IIOT device arranged as a smart streetlight controller 120 includes a corresponding connector (e.g., a set of "pins") at its base, which permits electro-mechanical coupling of the smart sensor IIOT device (e.g., smart streetlight controller 120) to the luminaire 138.

The smart sensor IIOT device in FIG. 2 is configured as a smart streetlight controller 120. The smart streetlight controller 120 has support circuitry including a power supply, a controller arranged to direct a volume of light 140 output from the luminaire 138 associated with the smart streetlight controller 120 (e.g., a pulse width modulation (PWM) controller, a light emitting diode (LED) driver, dimming circuit, ballast, and the like), and certain switching and control circuits, which are further described in the present disclosure.

In some cases, the smart streetlight controller 120 is configured to capture data regarding any type of condition to be sensed 244 in proximity of the streetlight or streetlight pole where the smart streetlight controller 120 is deployed. Based on any such condition, the volume of light 140 may be adjusted. In at least some cases, the smart streetlight controller 120 is configured to report any number of sensed conditions to a customer-based computing server. In these cases, the customer-based computing server may collect information about the streetlight, the area proximal to the streetlight, the status of the luminaire 138, the status of the light source, or any other data.

The smart streetlight controller 120 may also optionally include photo-sensitive circuitry that senses ambient light from the sun/moon 101. The smart streetlight controller 120 may use the sensed information to control the volume of light 140 from the luminaire 138. Additionally, as described herein, the smart streetlight controller 120 includes computational circuitry to calculate certain time information (e.g., sunrise and sunset) based on the terrestrial location of the smart streetlight controller 120 and celestial movement of the sun relative to the location of the smart streetlight controller 120 on Earth. Using the calculated sunrise and sunset information, and optionally using on other information and input, the smart streetlight controller 120 may further control the light output from the luminaire 138.

Figure 3B:
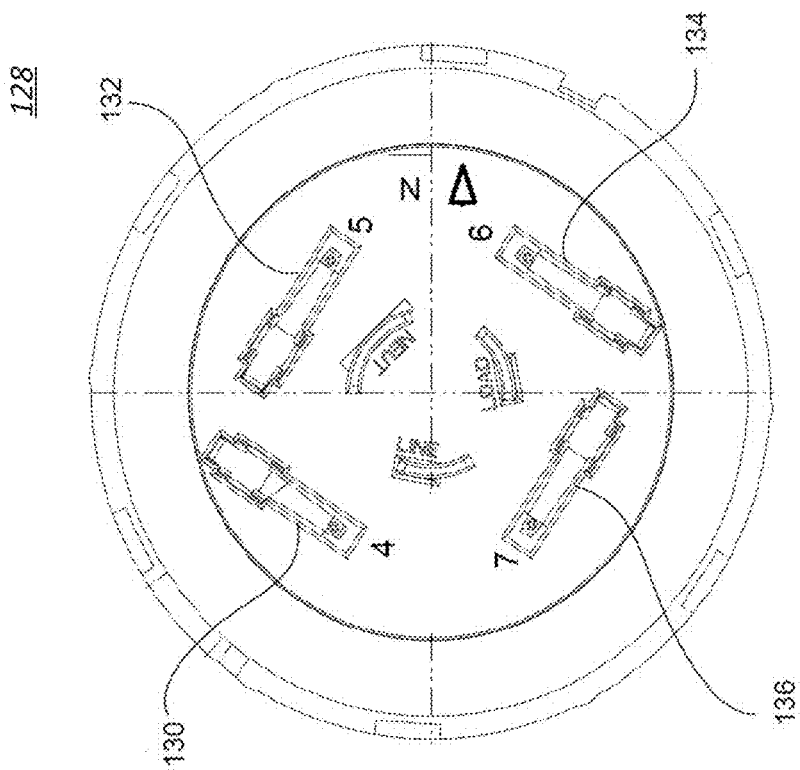
FIG. 3B is an embodiment of a base of the smart streetlight controller of FIG. 3A.
Figure 3A:
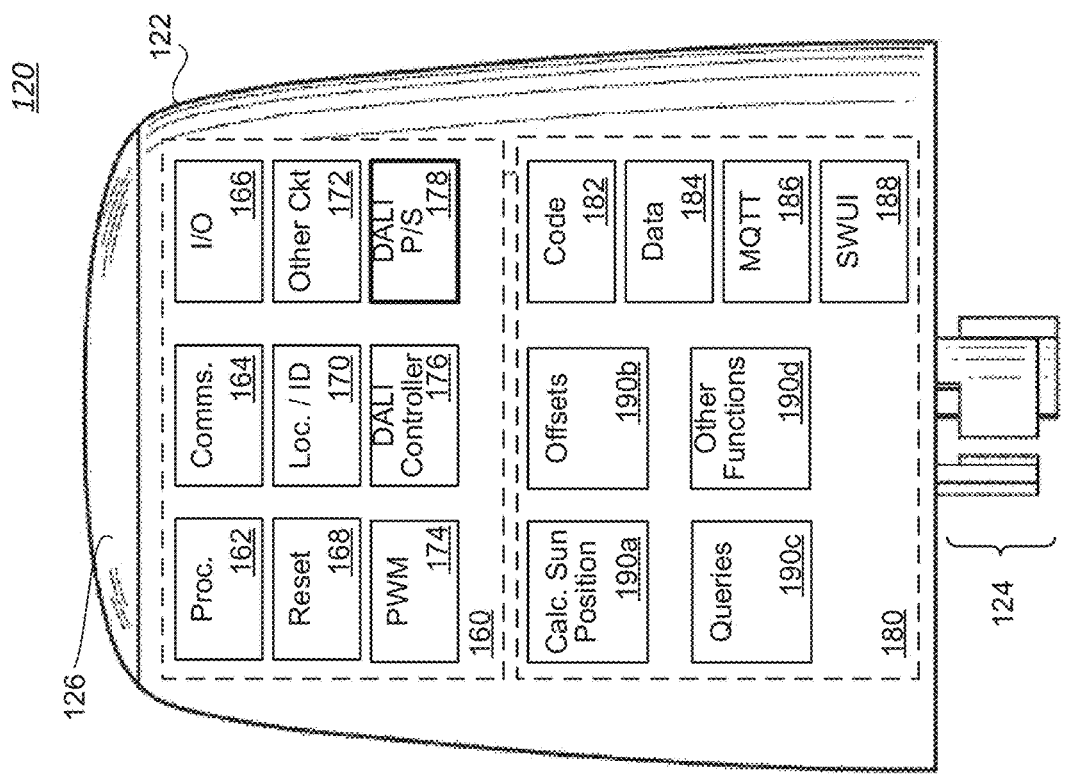
FIG. 3A is a smart streetlight controller embodiment.

FIG. 3A is a smart streetlight controller 120 embodiment. FIG. 3B is an embodiment of a base 128 of the smart streetlight controller 120 of FIG. 3A. The base 128 conforms to a standardized powerline interface. In the present disclosure, FIGS. 3A-3B may be individually or collectively referred to as FIG. 3. Structures earlier identified are not repeated for brevity.

The smart streetlight controller 120 is arranged with a generally cylindrical housing 122. The generally cylindrical housing 122 may be formed of a plastic, a glass, a metal, a composite material, or any other suitable material. The generally cylindrical housing 122 may in some cases have heat dissipation properties to assist in the removal of heat generated by electronic circuitry inside the housing. In at least some cases, the generally cylindrical housing 122 is arranged to resist nesting birds or other animals. In at least some cases, the generally cylindrical housing 122 is arranged to resist an accumulation of dirt, snow, or any foreign bodies or materials. In at least some cases, the generally cylindrical housing 122 is symmetrically arranged to have a generally same visual appearance when viewed from any perspective.

The generally cylindrical housing 122 includes a connector 124 (e.g., a set of "pins") that is compliant with a standardized powerline interface. In the embodiment of FIG. 3, the standardized powerline interface is a roadway area lighting standard promoted by a standards body such as ANSI C136.41 (e.g., a NEMA-based connector/socket system), but other standardized powerline interfaces are contemplated (e.g., an interface compliant with the ZHAGA CONSORTIUM, which is an international association that creates industry standards in the LED lighting industry). When the smart streetlight controller 120 is deployed, the pins of the connector 124 mate with a corresponding receptacle (e.g., a socket) that is integrated in a streetlight, a luminaire, a control box, or some other structure, which permits electro-mechanical coupling of the smart streetlight controller 120 to the streetlight, luminaire, control box, or the like.

The generally cylindrical housing 122 of the smart streetlight controller 120 includes a light-transmissive surface 126. The light transmissive surface may be transparent or partially transparent (e.g., partially opaque). In some embodiments, the light-transmissive surface 126 is integrated with the generally cylindrical housing 122, and in other cases, the light-transmissive surface 126 is a distinct structure that is removably or fixedly coupled to the generally cylindrical housing 122. In the embodiment of FIG. 3, the light-transmissive surface 126 is arranged at a "top" of the smart streetlight controller 120, but in at least some embodiments, the light-transmissive surface 126 is formed additionally or alternatively in or through a surface wall of the generally cylindrical housing 122. Generally, the light-transmissive surface 126 permits ambient light to reach an electronic light sensor (e.g., a photosensor, which is not shown in FIG. 3) formed within a volumetric cavity inside the generally cylindrical housing 122. As described in the present disclosure, the light sensor is arranged, in at least some cases, to provide a first output signal that directs a light source to illuminate when light reaching the light sensor crosses a determined first threshold, and to provide a second signal (e.g., an alteration of the first signal or a different signal) when the light reaching the light sensor crosses a determined second threshold. In some cases, the first and second thresholds are the same thresholds, and in some cases, the first and second thresholds are different thresholds.

One of skill in the art will recognize that the smart streetlight controller 120 embodiment of FIG. 3A is non-limiting. In other cases, rather than a streetlight controller, or rather than a streetlight controller in the generally cylindrical housing 122, the device of FIG. 3A may be realized as any suitable smart sensor IIOT device and in any suitable housing shape, form, configuration, and the like.

The smart streetlight controller 120 depicted in FIG. 3A, and in fact the smart devices contemplated in the present disclosure, are understood by those of skill in the art to apply to many types of smart devices including small cells, smart hubs, smart streetlight controllers, smart monitor devices, and many others. The embodiment of FIG. 3A includes a microcontroller 160. The smart streetlight controller 120 also includes a standardized powerline interface 124, which in the embodiment of FIG. 3A is along the lines of, but not limited to, a NEMA-based connector.

The microcontroller 160 is arranged with a processor 162, a communications module 164, an input/output (I/O) module 166, reset circuitry 168, a location/identification module 170 (e.g., global positioning system (GPS), a WiFi, Bluetooth, LAN, mobile tower triangulation location signals, local government or mobile location device, MAC ID, IMEI module, or some other unique location or identification device), and certain other circuits 172. In some embodiments, the location/identification module 170 will have a memory and be able to store the location information that it receives from any source, including any of the above stated or from a local transfer at the time of installation. In some embodiments, the location/identification module will be installed at fixed location, such as street light on a light pole and will not move after installation. The location might be uploaded from another circuit that has stored therein the location of that light pole, such as a local memory, a wired input, a wireless input or other source, such as those listed elsewhere herein. Additionally, the microcontroller 140 may optionally include a pulse width modulation (PWM) circuit 174, a digital addressable lighting interface (DALI) controller 176, and a DALI power supply 178. The microcontroller 140 is represented with a dashed line box to make clear that in some cases, the various circuits and modules are included in a single microcontroller package, and in other cases, any one or more of the modules 162-178 may be partially included in a microcontroller package and partially outside a microcontroller package, or any one or more of the modules 162-178 may be entirely outside of the microcontroller package. Additionally, any one or more of the modules 162-178 may be optionally included or excluded. The particular description herein with respect to the smart streetlight controller 120 of FIG. 3A does not divert from the teaching of the present disclosure, and any particular representation herein is not limiting unless expressly limited in the claims that follow.

In addition to the microcontroller 160, the smart streetlight controller 120 also includes memory 180. The memory may in some cases be included in the microcontroller 160, in any particular module of the microcontroller 160, or in a separate and distinct package. The memory 180 includes storage space for executable software instructions, which, when executed by processor 162, cause the smart streetlight controller 120 to perform any particular programmed acts. The memory 180 also includes an area to store data that is captured, received, created, determined, or in any other way generated. Implementations of a communications protocol 186 may be stored in the memory 180. The communications protocol may be any suitable protocol. In at least one embodiment, such as the embodiment of FIG. 3A, a suitable communications protocol is a message queueing telemetry transport (MQTT) protocol.

Memory 180 includes storage for a system-wide unique identifier 188 (SWUI). The SWUI 188 may be stored in clear text. The SWUI 188 may be encrypted, hashed, or obfuscated in some other way. In some cases, the SWUI 188 is generated, populated, or otherwise implemented in cooperation with the communications module 164, the location/identification module 170, or some other electronic circuitry (e.g., module) of the smart streetlight controller 120.

As described herein, the SWUI 188 may be formed from one or more parts or whole of an international mobile subscriber identity (IMSI) code, mobile country code (MCC), mobile network code (MNC), mobile sequential serial number (MSIN), electronic serial number (ESN), integrated circuit card identifier (ICCID), international mobile equipment identifier (IMEI), mobile station ISDN number (MSISDN), MAC address, one-time random number generator, or some other extended unique identifier (EUI) information or combination thereof.

In the embodiment of FIG. 3A, the processor 162 is arranged to execute software instructions (i.e., code 182) stored in the memory 180. The execution of such code 182 may include retrieving particular data 184 stored in the memory 180, and in at least some cases the cooperation between the executing software code 182 and the data 184 stored in the memory 180 causes the I/O module 166 to operate the PWM circuitry 174, the DALI controller 176, the DALI power supply 178, or any of the other circuitry 172. In at least one example, executed code 182 is arranged to direct output of visual light from a corresponding luminaire in accordance with a pulse width modulate (PWM) signal generated by the PWM module 174.

As described herein, the smart streetlight controller 120 is arranged to operate semi-autonomously. The smart streetlight controller 120 may communicate status information, warning information, alerts, or any other suitable information toward a customer-based computing server. The information may be communicated on a schedule, at a request, or upon an event. The information, once passed, may be used, for example, to populate one or more web pages deliverable to a user via a web-based management tool. In order to perform such communication, the information may be passed to and from the smart streetlight controller 120 via the communications module 164.

In the embodiment of FIG. 3A, the communications module 164 may be arranged as a wireless connection device capable of communicating on any suitable medium (e.g., radio frequency (RF), optical, audio, ultrasound, or some other part of the electromagnetic spectrum). In at least some cases, the communications module 164 is arranged for a communication medium that conforms to a cellular or cellular-based protocol (e.g., 4G, LTE, 5G, 6G, or the like).

Notwithstanding the discussion herein, one of skill in the art will recognize that the DALI modules 176, 178 are optional and may be implemented in a variety of ways without diverting from the teaching of the present disclosure.

Turning to FIG. 3B, a view looking down onto the base 128 of the smart streetlight controller 120 is presented. Seven contact surfaces are shown in a configuration that complies with a standardized powerline interface. A physical marking, "N" and a corresponding arrow are physically labeled on the base to guide an installer as to the proper orientation of a base 128 when installed.

In the embodiment of FIG. 3, the standardized powerline interface has a set of primary contacts arranged to carry a Line voltage signal, a Load voltage signal, and a Neutral voltage signal, each of which is located about a central location in the base 128 (i.e., semi-circular contact structures (e.g., pins, blades, connectors, or the like) physically labeled "Line," "Load," and "Neut." on the connector represented in FIG. 3B). The primary contacts are arranged to pass a plurality of power transmission signals, which may be high voltage alternating current signals (AC) of 220 VAC, 280 VAC, 480 VAC, or some other voltage.

The standardized powerline interface further has a set of secondary contacts, which includes a first pair of secondary contacts 130, 132 (i.e., two offset spring steel contacts physically labeled "4" and "5," respectively, on the connector represented in FIG. 3B) and a second pair of secondary contacts 134, 136 (i.e., two offset spring steel contacts physically labeled "6" and "7," respectively, on the connector represented in FIG. 3B). In cases where the standardized powerline interface conforms to a NEMA-based protocol such as ANSI C136.41, the first and second pairs of secondary contacts may be referred to as NEMA pins 4/5 and NEMA pins 6/7, respectively. In some cases, the set of is arranged to carry illumination signal information such as a plurality of optional dimmer control signals. In cases where the set of four secondary contacts pass dimmer control signals, it is recognized that four dimmer control signals permit two independent dimmer control channels. In some cases, a single dimmer control signal is used as a node for a reference plane (e.g., an earth/chassis ground), and three separate dimmer control signals are implemented or implementable. In other cases, at least some of the four secondary contacts are arranged to communicate encoded binary data, and in still other cases, the secondary contacts implement a particular communication protocol (e.g., USB, I2C, SPI, or the like).

The position of the sun may be calculated relative to any terrestrial coordinates on Earth. More specifically, the position of the sun relative to a specific position on Earth (e.g., latitude and longitude) may be calculated for any specific date and for any specific time.

Additionally, or alternatively, a specific time on a specific date that the sun is at a specific position relative to a specific earthly location can be calculated. This calculated value may be used as streetlight control time. In this way, if a streetlight is desirably turned on or turned off every day when the sun is at a same specific position relative to the streetlight, the specific time of day when the sun is in that relative position can be calculated for any specific date and used as a streetlight control time.

A streetlight control time, as the term is used herein, is a specific time that a light source is controlled by a smart streetlight controller 120 via certain illumination signal information. A streetlight control time may be a time that the smart streetlight controller 120 directs the light source to turn on, turn off, dim, dim to a specific light output, flash, flash a code or an encoded message, change the properties of generated light (e.g., color, intensity, warmth, and the like), or control the streetlight in any other way. A streetlight control time may be positive or negative.

In some cases, a plurality of streetlight control times may be generated and applied. Different streetlight control times may be arranged to direct different actions of the light source. A plurality of streetlight control times may be prioritized. Accordingly, the concept of streetlight control times are flexibly implemented, and the implementation of many different types and functions of streetlight control times is contemplated.

In at least one embodiment, a streetlight control time desirably directs a streetlight to turn off at, or soon after, sunrise when the sun is at a first specific position relative to the streetlight. In at least one embodiment, a streetlight control time desirably directs a streetlight to turn on at, or soon before, sunset when the sun is at a second specific position relative to the streetlight. Using the terrestrial position of the streetlight (e.g., as determined by a location/identification module 170), a first streetlight control time in any given day when the sun is at the first specific position can be calculated, and a second streetlight control time in the given day when the sun is at the second specific position can be calculated. These two specific streetlight control times (i.e., the first and second streetlight control times) can be used to turn off the streetlight in the morning and to turn on the streetlight at night. Hence, it is also recognized that these streetlight control times will naturally change (i.e., be re-calculated to different values) as time passes due to the motion of Earth around the sun.

Considering the operations of a smart streetlight controller 120 as taught in the present disclosure, several terms are now discussed.

Within the context of the present disclosure, the term, "sunrise," means an instant near daybreak of any given day under ideal meteorological conditions and with standard refraction of the rays of the sun when the upper edge of the sun's perimeter is coincident with an ideal horizon.

Within the context of the present disclosure, the term, "sunset," means an instant near nightfall of any given day under ideal meteorological conditions and with standard refraction of the rays of the sun when the upper edge of the sun's perimeter is coincident with an ideal horizon.

One of skill in the art will recognize that due to atmospheric refraction, light from the sun is bent, or refracted, as it enters Earth's atmosphere, and for this reason, apparent sunrise occurs shortly before the sun crosses above the ideal horizon and apparent sunset occurs shortly after the sun crosses the below the ideal horizon. In light of these effects, which may be further compounded by changes in air pressure, changes in relative humidity, and other metrological conditions, it is recognized that streetlight safety may be improved by turning the streetlight on at some point before the calculated time of sunset, and turning the streetlight off at some point after the calculated time of sunrise.

Within the context of the present disclosure, the term, "civil dawn," means the instant near daybreak of any given day under ideal metrological conditions and with standard refraction of the rays of the sun when the center of the sun is at a depression angle of six degrees (6°) below an ideal horizon. In the absence of moonlight or artificial lighting, a large object will be sufficiently illuminated that the object can be seen, but no detail is discernible.

Within the context of the present disclosure, the term, "civil dusk," means the instant near nightfall of any given day under ideal metrological conditions and with standard refraction of the rays of the sun when the center of the sun is at a depression angle of six degrees (6°) below an ideal horizon. In the absence of moonlight or artificial lighting, a large object will be sufficiently illuminated that the object can be seen, but no detail is discernible.

Within the context of the present disclosure, the term, "latitude," means an angular measurement of north-south location on Earth's surface. To add context, latitude ranges: 1) from ninety degrees (90°) south at the South Pole; 2) through zero degrees (0°) all along Earth's equator; 3) to ninety degrees (90°) north at the North Pole. Conventionally, latitude is a positive value in Earth's northern hemisphere and a negative value in the southern hemisphere.

Within the context of the present disclosure, the term, "longitude," means an angular measurement of east-west location on Earth's surface. To add context, longitude ranges from the Prime Meridian, which passes through Greenwich, England. With reference to a three-hundred-sixty (360°) circle, the international date line is accepted at plus or minus one-hundred-eighty degrees (+/−180°) longitude because 180° east longitude is the same meridian as 180° west longitude. Conventionally, east longitude is referred to as positive and west longitude is referred to as negative.

Within the context of the present disclosure, the term, "celestial sphere," means an abstract sphere centered on Earth and having an arbitrarily large radius. Along the lines of an imaginary spherical "movie screen," all celestial objects in the sky (e.g., all stars, planets, and other bodies in space) are conceptually projected upon the inner surface of the movie screen (i.e., celestial sphere). Coordinates on the celestial sphere are specified in degrees of declination and right ascension, which is roughly analogous to latitude and longitude coordinates on Earth's surface.

Within the context of the present disclosure, the term, "right ascension," is roughly analogous to longitude within a system such as a celestial sphere. Right ascension defines an angular offset from the meridian of the point on the celestial sphere at which the plane of Earth's orbit crosses the plane of Earth's equator, moving from south to north (i.e., an angular offset from the meridian of the vernal equinox).

Within the context of the present disclosure, the term, "declination," is roughly analogous to latitude within a system such as a celestial sphere. Declination measures an angular displacement north or south from the projection of Earth's equator on the celestial sphere to the location of a celestial body. Along these lines, "solar declination" within the context of the present disclosure means the declination of the sun. Solar declination varies from: 1) minus twenty-three and forty-four hundredths degrees (−23.44°) at winter solstice (norther hemisphere); 2) through zero degrees (0°) at the vernal equinox; 3) to plus twenty-three and forty-four hundredths degrees (+23.44°) at summer solstice. A variation in solar declination is an astronomical description of the sun (in the northern hemisphere) heading south for the winter.

Within the context of the present disclosure, the term, "azimuth," means a value measured clockwise from true north to the point on the horizon directly below the object in a particular coordinate system for locating specific positions in the sky. Azimuth is measured clockwise from true north to the point on the horizon directly below the object. For example, if the azimuth of a constellation is thirty-five degrees (35°) from north, and the elevation is sixty degrees (60°), the object can be seen by looking northeast, about two-thirds of the way up from the horizon. Because Earth rotates, azimuth and elevation numbers for stars and planets constantly change with time and with the point on Earth from which the object is observed.

Within the context of the present disclosure, the term, "elevation," means a value measured vertically from an azimuthal point the horizon up to the object in a particular coordinate system for locating specific positions in the sky. Elevation is measured angularly from the ground. For example, if the azimuth of a constellation is one-hundred-thirty-five degrees (135°) from north, and the elevation is thirty degrees (30°), the object can be seen by looking southeast, about one-third of the way up from the horizon. Because Earth rotates, azimuth and elevation numbers for stars and planets constantly change with time and with the point on Earth from which the object is observed.

Within the context of the present disclosure, the term, "zenith angle," means an angular value measured from straight up (zenith) to a point in the sky. Zenith angle can be used in a particular coordinate system for locating specific positions in the sky with azimuth to indicate the position of a star or other celestial body. Zenith angle is the complementary angle of the elevation (i.e., elevation=ninety degrees minus zenith (90°—zenith)). The cosine of the solar zenith angle is used in at least some cases to calculate the vertical component of direct sunlight shining on a horizontal surface.

Within the context of the present disclosure, the term, "UTC," means Coordinated Universal Time. UTC is based on atomic clock time. Leap seconds are added when necessary to match earth-motion time. A UTC offset is a difference in hours and minutes between Coordinated Universal Time (UTC) and a local time for a particular place and date.

Within the context of the present disclosure, the term, "Julian calendar," means the calendar set in place as the law of the land by Julius Caesar in 46 BC. The Julian calendar set the number of days in a year at 365, except for leap years which have 366, and occurred every 4 years. Pope Gregory XIII reformed the Julian calendar into the Gregorian calendar, which further refined leap years and corrected for past errors by skipping 10 days in October of 1582.

The smart streetlight controller 120 includes a location/identification module 170. Once the smart streetlight controller 120 is deployed, the location/identification module 170 may be accessed to receive, calculate, generate or otherwise isolate a specific terrestrial position of the smart streetlight controller 120. In at least some cases, the specific terrestrial position includes a first value representing a latitude and a second value representing a longitude.

The smart streetlight controller 120 is a real time device. That is, at any given time, the smart streetlight controller 120 may retrieve, receive, calculate, generate, or otherwise isolate a specific date and a specific time. In some cases, time and date values are parsed from data received by the location/identification module 170. In these or other cases, time and date values are parsed from data received by the communications module 164 (e.g., a transceiver arranged for communications according to a cellular-based protocol). In these or still other cases, time and date values are retrieved from other circuitry 172, which may include a real-time clock circuit. Other means of isolating a time value and a date value are contemplated.

The smart streetlight controller 120 is configured to calculate one or more positions of the sun relative to the terrestrial position of the smart streetlight controller 120. Accordingly, the smart streetlight controller 120 may be arranged to calculate any number of desirable solar time values. For example, considering the specific terrestrial location of the smart streetlight controller 120, a time of sunrise at that terrestrial location may be calculated, a time of civil dawn at that terrestrial location may be calculated, a time of sunset at that terrestrial location may be calculated, a time of civil dusk at that terrestrial location may be calculated, a time when the sun is at a zero degrees (0°) zenith angle at that terrestrial location may be calculated, or any other time associated with a specific position of the sun relative to the terrestrial position of the smart streetlight controller 120 may be calculated. More specifically, in at least some embodiments, the memory 180 may include at least one algorithmic module 190a that calculates specific local time values when the sun will be in a specific position. Inputs and outputs to the algorithmic module 190a may be of any suitable form and reference system. At least one exemplary set of operations of the algorithmic module 190a is set forth in FIG. 4A.

The memory 180 may optionally be arranged with other functional modules. For example, in some cases, the memory 180 includes an offsets module 190b, a queries module 190c, and an other functions module 190c.

The offsets module 190b is arranged to generated, apply, or generated and apply offsets to a streetlight control time. Applying such offsets may create one or more new or additional streetlight control times. In many cases, the offset is applied (e.g., added, subtracted) to a calculated time when the sun is in a particular position relative to a terrestrial position. For example, if a user of the smart streetlight controller 120 desires to always set at streetlight control time that turns on a streetlight at 15 minutes before sunset, the user can store a 15 minute time value offset in memory 180 and command the offsets module 190b to apply the offset to a previously or later calculated streetlight control time. In this way, the algorithmic module 190a will calculate a time of sunset on any certain day (e.g., a first streetlight control time), and the offsets module 190b will adjust the time of sunset value by subtracting 15 minutes to create a new streetlight control time (e.g., a second streetlight control time). Accordingly, the subject streetlight will turn on at a different time each day, but the time that the streetlight turns on will always be 15 minutes before sunset. This functionality adds predictability, improves safety, and provides energy efficiency that heretofore was unavailable.

One of skill in the art will recognize that any suitable number of offsets may be created and applied to any suitable number of streetlight control times, and an offset may be optionally provided to any generated time value that is based on the position of the sun. The offsets may be zero or some other number. An offset may in some cases subtract time (e.g., make earlier) from a particular time value. An offset may in some cases add time to a streetlight control time, which renders a later point in time. An offset may in some cases subtract time from a streetlight control time, which renders an earlier point in time. Offsets may be entered manually, programmatically, on a schedule, or in any other way.

The queries module 190c is an optional module arranged to inquire, retrieve, and gather additional data to direct the operations of a smart streetlight controller 120. For example, the queries module 190c may be used to provide offsets to any generated streetlight control time that is based on the position of the sun. The queries module 190c may cooperate with the offsets module 190b, the algorithmic module 190a, or other modules of the smart streetlight controller 120.

In one case, the queries module 190c works cooperatively with a communications module 164. For example, the queries module 190c may retrieve information from a website, a network-accessible repository, a remote computing device, a local mobile computing device, or some other information source. In one optional case, the queries module 190c accesses a weather-related database or other source of weather information. Based on the access to weather-related information, if it is determined that inclement weather, which will darken an area proximate the smart streetlight controller 120, is coming, the queries module 190c may provide a weather-related offset to the offsets module 190b, which will further adjust a streetlight control time.

Figure 4A:
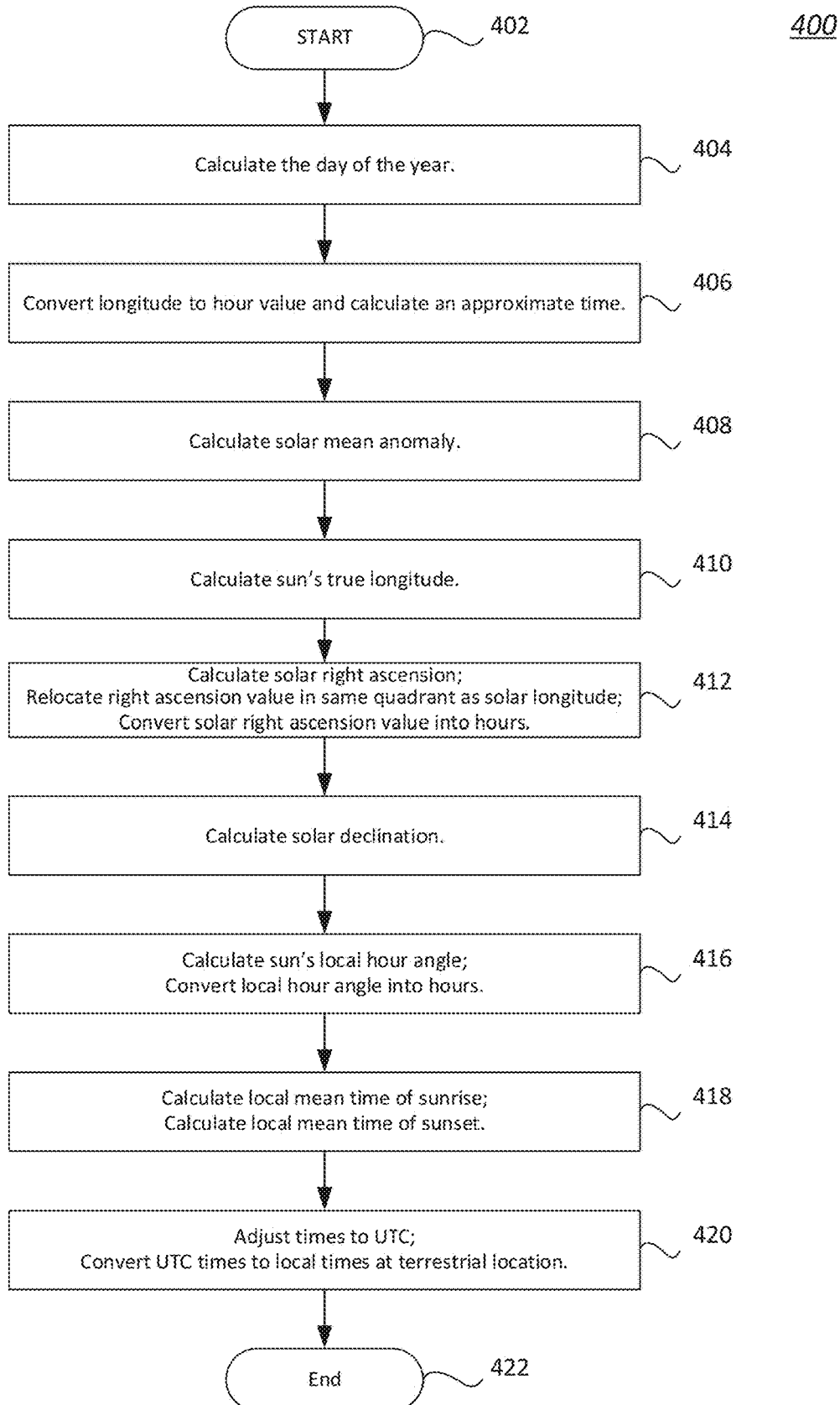
FIG. 4A is a data flow diagram representing processing of an algorithmic module that calculates time values based on a calculated position of the sun relative to a specific terrestrial position on Earth.

FIG. 4A is a data flow 400 diagram representing processing of an algorithmic module 190a that calculates time values based on a calculated position of the sun relative to a specific terrestrial position on Earth. The specific terrestrial position is the position (e.g., latitude, longitude) on the face of Earth of the smart streetlight controller 120 that is executing the algorithm.

In at least one exemplary case, the data flow 400 implements a known algorithm in a new way. Particularly, the algorithm used as basis for the design of at least one embodiment of executable software instructions stored in a memory 180 and configured in an algorithmic module 190a may be found in the ALMANAC FOR COMPUTERS, 1990, PUBLISHED BY THE NAUTICAL ALMANAC OFFICE, U.S. NAVAL OBSERVATORY, WASHINGTON, D.C., 20392.

It is recognized that the present data flow 400 calculates the position of the sun relative to a specific terrestrial position on Earth. Various time values are also generated based on the calculated position. While the present data flow 400 is directed toward calculating data associated with the sun, one of skill in the art will recognize that the data flow is not so limited. In at least some cases, for example, a data flow along the lines of data flow 400 (FIG. 4A) may be used to calculate the position of the moon relative to a specific terrestrial position on Earth along with a phase of the moon as evident at the specific terrestrial position on Earth on the appointed day. In at least some cases, for example, the presence of a full moon may be used to adjust a streetlight control time. Such knowledge may also, in some cases, be coupled with local weather information isolated by the queries module 190c to adjust a streetlight control time or other illumination signal information that controls the light output of a particular streetlight.

Processing begins at 402 and advances to 404. At 404, a day of the year is calculated as an offset from January 1. In some cases, the offset is mathematically calculated. In some cases, the offset is retrieved from a table of stored offsets. In some cases, the offset is retrieved from a network source, such as a known website. Processing advances to 406.

At 406, the longitude value of the specific terrestrial position is converted to an hour value, and one or more approximate times are calculated. For example, in some cases, a sunrise time is desired. In these or other cases, a sunset time is desired. The world is divided into twenty-four equally sized longitudinal time zones. Accordingly, a terrestrial position that includes longitude can be used to determine an offset within the particular time zone. Additionally, sunrise values, sunset values, or any other values may be calculated as "hour values." Processing advances to 408.

At 408, the sun's mean anomaly may be calculated for each desired longitudinal time value. The mean anomaly is the fraction of Earth's elliptical orbit period that has elapsed since Earth passed the pericenter of the orbit. Stated differently, the mean anomaly is an offset from where Earth would be if traveling in a uniform, circular orbit rather than an elliptical orbit. In at least some cases, the mean anomaly is calculated as an angular offset or angular distance from the pericenter that Earth would have if it had been moving in a circular orbit, with constant speed, in the same orbital period as the Earth actually travels in its non-circular (i.e., elliptical) orbit. Processing advances to 410.

At 410, the sun's true longitude is calculated as a trigonometric function of the mean anomaly. The sun's true longitude is relative to the terrestrial position of the specific smart streetlight controller 120 that is executing the algorithm. Processing advances to 412.

At 412, the right ascension of the sun is calculated and converted to a time value such as hours. In these cases, the time value is a real number stored, for example, as a floating-point number, which may have any suitable precision. A first right ascension value is generated as trigonometric function of the sun's longitude. If necessary, the first calculated value is offset or otherwise adjusted to reflect a value in the same longitudinal quadrant as the terrestrial position of the specific smart streetlight controller 120 that is executing the algorithm. And finally, the right ascension value is converted into a time value (e.g., hours). The sun's ascension value may be thought of as an indication of where the sun is on an east-west trajectory relative to the terrestrial position. Processing advances to 414.

At 414, the sun's declination is calculated as a trigonometric function of the sun's longitude. The sun's declination may be thought of as an indication of how high the sun is in the sky relative the terrestrial position. Processing advances to 416.

At 416, the sun's local hour angle is calculated and converted to a time value (e.g., hours). The local hour angle may be calculated as a trigonometric function based on the sun's zenith and the latitudinal position of the specific smart streetlight controller 120 that is executing the algorithm. Subsequently, the local hour angle is translated to a desirable time value (e.g., hours). Processing advances to 418.

At 418, the time value of the local solar hour angle is used to calculate mean time values of any point on the apparent solar trajectory. For example, a mean sunrise time may be calculated, a mean sunset time may be calculated, or any other such time. The mean time values are calculated as a function of the calculate right ascension and the local hour angle. Processing advances to 420.

At 420, the calculated mean time values are adjusted to Coordinated Universal Time (UTC), and optionally further converted to the local time at the terrestrial position of the specific smart streetlight controller 120 that is executing the algorithm.

Processing advances to 422 and terminates.

Figure 4B:
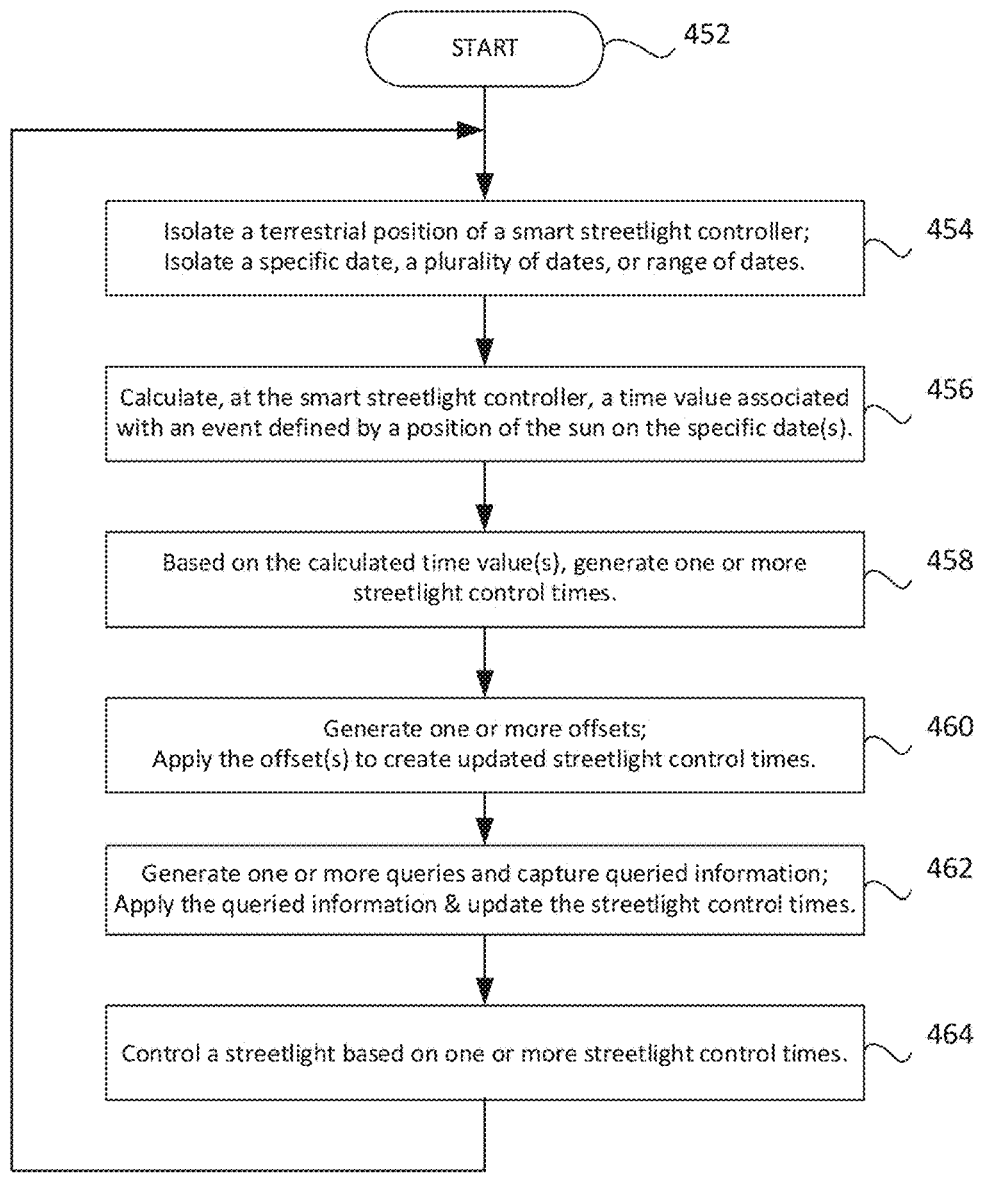
FIG. 4B is a data flow diagram representing processing of a smart streetlight controller to generate one or more streetlight control times.

FIG. 4B is a data flow 450 diagram representing processing of a smart streetlight controller 120 to generate one or more streetlight control times and any suitable illumination signal information.

Processing begins at 452 and advances to 454. At 454, a terrestrial position of a smart streetlight controller is isolated. In some cases, the specific terrestrial position is provided by a location/identification module 170. The terrestrial position may include latitude and longitude, a street address, a legal description from a tax assessor, or some other location information. In some cases, a device such as a global positioning system (GPS) is used to generate a specific terrestrial position. In some cases, the specific terrestrial position is hard coded in a memory such as memory 180 or hard coded in a module such as the location/identification module 170. In some cases, the specific terrestrial position is programmatically received and stored in memory.

Also at 454, a specific date, a plurality of dates, or range of dates is isolated. The date or dates are used to calculate a date certain, a time certain, or a date and time certain when a position of a celestial body such as the sun will be determined relative to one or more specific terrestrial positions. Processing advances to 456.

At 456, an algorithm module 190a is invoked to calculate, at the smart streetlight controller 120, a time value associated with an event defined by a position of a celestial body such as the sun or moon on the specific date or dates. The time value that is calculated may be any one or more of sunrise, sunset, civil dawn, civil dusk, high-noon, or some other time value. Processing in the algorithm module may be along the lines of the data flow 400 of FIG. 4A. In cases where a position of the moon is determined, a phase of the moon may also be determined. In some cases, a position and phase of the moon is used to generate or adjust a streetlight control time or to generate certain illumination signal information. Processing advances to 458.

At 458, based on the time value or values calculated at 456, one or more streetlight control times may be generated. As discussed herein, a streetlight control time is a time (e.g., a real-time value, a relative time value, a time offset from another time value, a prioritized time value, a conditional time value, or some other time value) at which a streetlight or one of its functions (e.g., illumination signal information) may be controlled.

In some cases, controlling a streetlight based on a streetlight control time includes communicating certain illumination signal information. The illumination signal information may include any such analog or digital signaling that directs or otherwise causes a light source to turn on, turn off, dim, dim to a specific light output, flash, flash a code or an encoded message, change the properties of generated light (e.g., color, intensity, warmth, and the like), or control the streetlight in any other way. The operations of the light source may be enabled, performed, directed, or otherwise implemented via a PWM module 174, a DALI controller module 176, a DALI power supply 178, or some other mechanism (e.g., I/O module 166, other functions module 190d, a reset module 168, a certain software function stored in code 182, or the light source control may be implemented in some other way. In these or still other cases, a streetlight control time may be used to direct another function such as taking a photograph, recording audio, communicating a message to a remote computer or mobile device or some other computing device, or directing some other action. Processing advances to 460.

At 460, one or more offsets to a streetlight control time are generated and applied to create one or more updated streetlight control times. The offsets may be a specific time before sunrise, after sunrise, before sunset, after sunset, or some other offset. In some cases, an offset is zero; in other cases, the offset is a negative value. Offsets may be in days, hours, minutes, seconds, or some other unit of time. In some cases, offsets may be conditional. For example, an offset may be a first value during a winter season and a second value during a summer season. Seasonal offsets may be further conditional on the specific terrestrial position of the smart streetlight controller 120. Processing advances to 462. At 462, any suitable number of zero or more queries are performed to gather additional information that may affect one or more streetlight control times. The queries may be managed or otherwise implemented by or through a queries module 190c. The queries may cover a wide variety of topics, features, sensors, circuits, and the like. A query that affects a streetlight control time may retrieve information from a sensor integrated with, or coupled to, the smart streetlight controller 120. A query that affects a streetlight control time may retrieve information from a network-accessible source such as website, a government agency, a private commercial database, a public commercial database, a library, a mobile device, a manually entered datum, or any other such source. The information captured may be used to adjust, overwrite, or affect a streetlight control time in any suitable way. Processing advances to 464.

At 464, one or more streetlight control times are used to direct a particular action of a smart streetlight controller 120 such as a light source of a streetlight. In addition, one or more functions of a streetlight associated with the smart streetlight controller 120 may also be controlled by modifying or otherwise generating the illumination signal information.

Processing advances back to 454 and continue in perpetuity.

Having now set forth certain embodiments, further clarification of certain terms used herein may be helpful to providing a more complete understanding of that which is considered inventive in the present disclosure.

Internet of Things (IOT) and Industrial Internet of Things (IIOT) devices are fixed and/or mobile electronic computing devices that are coupled or coupleable to a computing network. IOT devices are often described as devices with consumer facing applicability and IIOT devices are often described as devices with industrial or machine-to-machine applicability. The two types of devices (i.e., IOT and IIOT devices) have one or more computing processors, memory storing instructions that direct operations of the one or more computing processors, and network circuitry. In many cases, the IOT and IIOT devices also include a power source (e.g., one or more of a battery, a physical power interface, a power supply, a photovoltaic cell, an induction coil, etc.), at least one sensor (e.g., accelerometer, photo sensor, thermometer, and many others), and memory to store data collected by the device.

The present disclosure will use the term IIOT devices, but it is recognized that the principles described herein are equally applicable to IOT devices.

Rather than a general-purpose computing device, an IIOT device is typically arranged to perform a particular function or set of functions. An IIOT device may, for example, be arranged as an environmental sensor that collects data such as temperature, humidity, air quality, and the like. In these cases, the IIOT device is deployed in a city, rural area, or some other location, and the device is either programmed on site or at the factory to communicate with a specific remote computing server. The remote computing server may be arranged at a great distance (e.g., tens, hundreds, or even thousands of miles away) from the IIOT device. Alternatively, the remote computing server may be a smart phone tablet, or other computing device permanently or transitorily arranged a short distance (e.g., tens or hundreds of feet or inches or some other distance) from the IIOT device. In these cases, the IIOT device is programmed to communicate data to, from, or to and from a specific remote computing server.

Mobile network operators (MNOs) provide wireless cellular-based services in accordance with one or more cellular-based technologies. As used in the present disclosure, "cellular-based" should be interpreted in a broad sense to include any of the variety of technologies that implement wireless or mobile communications. Exemplary cellular-based systems include, but are not limited to, time division multiple access ("TDMA") systems, code division multiple access ("CDMA") systems, and Global System for Mobile communications ("GSM") systems. Some others of these technologies are conventionally referred to as UMTS, WCDMA, 4G, 5G, 6G, and LTE. Still other cellular-based technologies are also known now or will be known in the future. The underlying cellular-based technologies are mentioned here for a clearer understanding of the present disclosure, but the inventive aspects discussed herein are not limited to any particular cellular-based technology.

In some cases, cellular-based voice traffic is treated as digital data. In such cases, the term "voice-over-Internet-Protocol", or "VoIP," may be used to mean any type of voice service that is provided over a data network, such as an Internet Protocol (IP) based network. The term VoIP is interpreted broadly to include any system wherein a voice signal from a mobile computing device is represented as a digital signal that travels over a data network. VoIP then may also include any system wherein a digital signal from a data network is delivered to a mobile computing device where it is later delivered as an audio signal.

Standardized powerline interface connector devices of the types described herein are in at least some cases referred to as NEMA devices, NEMA compatible devices, NEMA compliant devices, or the like. And these devices include receptacles, connectors, sockets, holders, components, etc. Hence, as used in the present disclosure and elsewhere, those of skill in the art will recognize that coupling the term "NEMA" or the term "ANSI" with any such device indicates a device or structure compliant with a standard promoted by a standards body such as NEMA, ANSI, IEEE, or the like.

A mobile device, or mobile computing device, is an electronic device provisioned by at least one mobile network operator (MNO) to communicate data through the MNO's cellular-based network. The data may be voice data, short message service (SMS) data, electronic mail, world-wide web or other information conventionally referred to as "internet traffic," or any other type of electromagnetically communicable information. The data may be digital data or analog data. The data may be packetized or non-packetized. The data may be formed or passed at a particular priority level, or the data may have no assigned priority level at all. A non-comprehensive, non-limiting list of mobile devices is provided to aid in understanding the bounds of the term, "mobile device," as used herein. Mobile devices (i.e., mobile computing devices) include cell phones, smart phones, flip phone, tablets, phablets, handheld computers, laptop computers, body-worn computers, and the like. Certain other electronic equipment, such as IOT devices, IIOT devices, smart devices, and other like computing devices in any form factor, may also be referred to as a mobile device when this equipment is provisioned for cellular-based communication on an MNO's cellular-based network. Examples of this other electronic equipment include in-vehicle devices, medical devices, industrial equipment, retail sales equipment, wholesale sales equipment, utility monitoring equipment, streetlight controllers, small cells, transformer monitors, any type of "smart-city" devices, and other such equipment used by private, public, government, and other entities.

Mobile devices further have a collection of input/output ports for passing data over short distances to and from the mobile device. For example, serial ports, USB ports, WiFi ports, Bluetooth ports, IEEE 1394 FireWire, and the like can communicatively couple the mobile device to other computing apparatuses.

Mobile devices have a battery or other power source, and they may or may not have a display. In many mobile devices, a signal strength indicator is prominently positioned on the display to provide network communication connectivity information to the mobile device user.

A cellular transceiver is used to couple the mobile device to other communication devices through the cellular-based communication network. In some cases, software and data in a file system are communicated between the mobile device and a computing server via the cellular transceiver. That is, bidirectional communication between a mobile device and a global or local computing server is facilitated by the cellular transceiver. For example, a computing server may download a new or updated version of software to the mobile device over the cellular-based communication network. As another example, the mobile device may communicate any other data to the computing server over the cellular-based communication network.

Each mobile device client has electronic memory accessible by at least one processing unit within the device. The memory is programmed with software that directs the one or more processing units. Some of the software modules in the memory control the operation of the mobile device with respect to generation, collection, and distribution or other use of data. In some cases, software directs the collection of individual datums, and in other cases, software directs the collection of sets of data.

FIGS. 4A-4B are data flow diagrams illustrating non-limiting processes that may be used by embodiments of an IIOT device such as a smart streetlight controllers 120. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing devices embodiments such as one or more smart streetlight controllers 120. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments of industrial internet of things (IIOT) devices (e.g., smart streetlight controllers 120) that include or otherwise cooperate with one or more computing devices. It is recognized that these IIOT devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, smart streetlight controllers 120 have one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The smart streetlight controllers 120 illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the smart streetlight controllers 120 is a single hardware machine having at least some of the hardware and software listed herein, and in other cases, the smart streetlight controllers 120 embodiments are a networked collection of hardware and software machines working together cooperatively in a server farm, cluster, cloud, or other networked environment to execute the functions of one or more embodiments described herein. Some aspects of the conventional hardware and software of the particular computing device are not shown in the figures for simplicity.

Amongst other things, the exemplary computing devices of the present disclosure (e.g., smart streetlight controllers 120 of FIGS. 2-3) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

When so arranged as described herein, each IIOT device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of smart streetlight controllers and other processor-based "smart" devices, but other techniques and tools remain available to provision said IIOT devices and other smart devices. Therefore, the claimed subject matter does not foreclose the whole or even substantial streetlight controller technical field. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific streetlight control features that include onboard calculation of the position of the sun relative to a terrestrial position of the smart streetlight controller on any given day as taught herein. The embodiments described in the present disclosure improve upon known streetlight controller processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform streetlight controller functions and other smart computing device operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Repositories (e.g., database structures), if any are present in the IIOT and other computing systems described herein, may be formed in a single repository or multiple repositories. In some cases hardware or software storage repositories are shared amongst various functions of the particular system or systems to which they are associated. A repository (e.g., database) may be formed as part of a local system or local area network. Alternatively, or in addition, a repository may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the smart streetlight controllers 120 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the smart streetlight controller 120 and computing servers 250, 250*a*, 250*b*, 550*c*, and 550*f*. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of an IIOT device or some other computing system.

Buttons, keypads, computer mice, memory cards, serial ports, bio-sensor readers, touch screens, and the like may individually or in cooperation be useful to a technician operating an IIOT device or other computing system. The devices may, for example, input control information into the system. Displays, printers, memory cards, LED indicators, temperature sensors, audio devices (e.g., speakers, piezo device, etc.), vibrators, and the like are all useful to present output information to the technician operating the IIOT device or other computing system. In some cases, the input and output devices are directly coupled to the smart streetlight controllers 120 and computing servers 250, 250a, 250b, 550c, and 550f and electronically coupled to a processor or other operative circuitry. In other cases, the input and output devices pass information via one or more communication ports (e.g., RS-232, RS-485, infrared, USB, etc.).

As described herein, for simplicity, a technician may in some cases be described in the context of the male gender. It is understood that a technician can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., inputting system-wide unique identifiers (SWUI'S) of a plurality of IOT devices, IIOT devices, or other smart computing devices, inputting batch ID's, receiving information from the particular computing device, and the like). An example of an activity that is not real-time is one that occurs over an extended period of time (e.g., days, months, or years for a single instance) or that occurs based on intervention or direction by a technician or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The use of the phrase "set" (e.g., "a set of items") or "subset," unless otherwise noted or contradicted by context, is to be construed as a nonempty collection comprising one or more members.

The headings and Abstract of the Disclosure provided herein are for convenience only and do not interpret the scope or meaning of the embodiments.

In at least one example, a plurality of hundreds of IIOT devices are sold to a particular city. In this case, the IIOT devices are streetlight controllers, and each of the hundreds of streetlight controllers, along with thousands, tens of thousands, hundreds of thousands, or some other number of streetlight controllers are programmed at a factory with identical network communication parameters. When any of the hundreds, thousands, or millions of streetlight controllers are deployed, the streetlight controller will first communicate with a same global remote computing server. In this first communication, based on a system-wide unique identifier of the particular streetlight controller, the global remote computing server will determine which customer (e.g., city, power utility, department of transportation, or the like) the streetlight controller belongs to. Next, the global remote computing server will return a network address of a customer-based computing server that the streetlight controller should communicate with. In the example, this process is carried out by the city's hundreds of streetlight controllers, and each of those streetlight controllers will reprogram itself with the new network address. In this way, the city's customer-based computing server will be able to manage the hundreds of streetlight controllers, for example, by displaying a map, overlaying a location of each streetlight controller on the map, and populating the map or other such content with information about each streetlight or its associated streetlight controller.

The various embodiments described above can be combined to provide further embodiments. Various features of the embodiments are optional, and, features of one embodiment may be suitably combined with other embodiments. Aspects of the embodiments can be modified, if necessary to employ concepts of the various patents, application and publications to provide yet further embodiments.

The celestial scheduling technology described in the present disclosure provide several technical effects and advances to the field of streetlight controllers.

Technical effects and benefits include the ability to improve the reliability, energy efficiency, and safety of streetlighting. Conventional streetlight controllers include photo-sensitive circuitry (e.g., a photosensor) to determine when the streetlight should turn on and when the streetlight should turn off. If the photosensor circuit fails, or if a window to the sensor is obstructed (e.g., by dirt, fowl, damage, or some other cause), the streetlight may either be wastefully always illuminated or dangerously always extinguished. In the present disclosure, a programmatic approach to overcome the limitations of conventional streetlight controllers is proposed. The new approach may be used cooperatively with photo-sensitive circuitry or as an alternative to photo-sensitive circuitry. What's more, with a determined level of expected ambient light, the streetlight controller may finely tune a streetlight to illuminate more brightly or less brightly in a desired way. This improvement can increase safety, save energy, and provide a more uniform illumination over the course of a single evening or a climatic season.

The present disclosure sets forth details of various structural embodiments that may be arranged to carry the teaching of the present disclosure. By taking advantage of the flexible circuitry, mechanical structures, computing architecture, and communications means described herein, a number of exemplary devices and systems are now disclosed.

Example A-1 teaches A method to control a streetlight with a smart streetlight controller, comprising: isolating a terrestrial position of the smart streetlight controller; isolating a specific date; calculating, at the smart streetlight controller, a time value associated with an event defined by a position of the sun on the specific date; generating a streetlight control time by applying an offset to the time value; and executing a streetlight control command at the streetlight control time.

Example A-1 may include the subject matter of Example A-1, and alternatively or additionally any other example herein, wherein the streetlight control command is a command to turn on the streetlight.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Various devices that utilize the circuits and modules of the present disclosure are described in U.S. Patent Application No. 62/614,918, filed Jan. 8, 2018, which is incorporated herein by reference in its entirety to the fullest extent allowed by law.

Various devices that utilize the circuits and modules of the present disclosure are described in International Patent Application PCT/US2019/012775, filed Jan. 8, 2019, which is incorporated by reference in its entirety to the fullest extent allowed by law.

U.S. Provisional Patent Application No. 63/002,190, filed Mar. 30, 2020, is incorporated herein by reference, in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A luminaire-mountable streetlight controller comprising:
   a powerline interface having primary contacts arranged to receive a plurality of power transmission signals from a luminaire connector to which the primary contacts are electromechanically coupled and secondary contacts arranged to communicate illumination commands to a controllable light source of a luminaire;
   a location positioning device;
   a processor arranged to receive terrestrial position information from the location positioning device; and
   a memory coupled to the processor, the memory storing instructions which, when executed by the processor, cause the processor to:
      isolate, via the terrestrial position information, a terrestrial position of the location positioning device;
      isolate a specific date;
      calculate a time value associated with an event defined by a position of the sun on the specific date at the terrestrial position;
      generate a streetlight control time by applying an offset to the time value; and
      cause the illumination command to be presented to the secondary contacts at the streetlight control time.

2. The streetlight controller of claim 1, wherein one or more of the illumination commands directs the controllable light source to flash.

3. The streetlight controller of claim 1, wherein the location positioning device includes a global positioning system (GPS) device, and the terrestrial position includes a latitude value and a longitude value.

4. The streetlight controller of claim 1, wherein one or more of the illumination commands directs the controllable light source to either turn on or turn off.

5. The streetlight controller of claim 1, wherein the illumination commands directs the controllable light source to dim to a specific light output.

6. The streetlight controller of claim 1, wherein the specific date is derived from the terrestrial position information.

7. A streetlight system comprising:
   a streetlight support structure;
   a luminaire supported by the streetlight support structure and including a controllable light source and a socket connector located on a top side of the luminaire;
   a streetlight controller electromechanically coupled to the luminaire, the streetlight controller including:
      primary contacts inserted into the socket connector of the luminaire, the primary contacts receiving power signals from the luminaire,
      secondary contacts arranged to communicate streetlight control commands to controllable light source,
      a location positioning device;
      a processor arranged to receive terrestrial position information from the location positioning device; and
      a memory coupled to the processor, the memory storing instructions which, when executed by the processor, cause the processor to:
         isolate, via the terrestrial position information, a terrestrial position of the location positioning device;
         isolate a specific date;
         calculate a time value associated with an event defined by a position of the sun on the specific date at the terrestrial position;
         generate a streetlight control time by applying an offset to the time value; and
         cause the streetlight control commands to be presented to the secondary contacts at the streetlight control time.

8. The streetlight system of claim 7, wherein one or more of the streetlight control commands directs the controllable light source to flash.

9. The streetlight system of claim 7, wherein the location positioning device includes a global positioning system (GPS) device, and the terrestrial position includes a latitude value and a longitude value.

10. The streetlight system of claim 7, wherein one or more of the streetlight control commands directs the controllable light source to either turn on or turn off.

11. The streetlight system of claim 7, wherein one or more of the streetlight control commands directs the controllable light source to dim to a specific light output.

12. The streetlight system of claim 7, wherein the specific date is derived from the terrestrial position information.

* * * * *